March 31, 1936.    S. W. SILVERSTEIN    2,035,511
OPTICAL EXERCISER
Filed July 19, 1934

INVENTOR.
Samuel W. Silverstein
BY
ATTORNEY.

Patented Mar. 31, 1936

2,035,511

UNITED STATES PATENT OFFICE 2,035,511

OPTICAL EXERCISER

Samuel W. Silverstein, Passaic, N. J.

Application July 19, 1934, Serial No. 736,053

3 Claims. (Cl. 88—20)

This invention relates to an optical exerciser or orthoptic training device, the principal object of which is to train or exercise the muscles of the eyes and thereby improve faulty muscles. The invention is applied by means of the stereoscope which is a binocular instrument by means of which two pictures are superimposed and stand out in relief as one picture. The stereoscope is not used in the present invention with the object of obtaining relief, but instead it is used to determine when a series of double pictures superimpose, or when they diverge, as viewed by an individual. The eyes normally tend to bring the pictures into fusion with the result that when the pictures are purposely diffused the muscles of the eyes are exercised in bringing or tending to bring the picture subjects into fusion. By a gradual change from a condition of fusion to a condition of extreme divergence or convergence the muscles are exercised over a wide range, and by regular exercises the conditions of squinting and cross-eyes can be relieved and in some instances cured.

An orthoptic training device for exercising the eye muscles is disclosed in U. S. Patent 1,948,901, Feb. 27, 1934. This comprises a stereoscope with means for mechanically adjusting the position of a pair of pictures relative to each other and an index for showing the position of these pictures. These pictures can be brought into fusion or into divergence by the operation of the adjusting mechanism.

The present invention improves upon this patent by eliminating the mechanism and using instead a motion picture film which is slidably movable in front of ground glass or similar screens on the focal centre of the lenses of the stereoscope. The film is provided with a series of double pictures spaced longitudinally of the film in stereoscopic relation to each other when viewed through the stereoscope, that is, a portion of one picture blends or fuses with a portion of the other and together they make a complete picture. One of the series of pictures is spaced so that both pictures can be brought into the focal centre of both lenses of the device at the same time. This is the normal picture and for normal sight these pictures should fuse or partially overlap so as to form a complete single picture. The pictures on the other portions of the film are spaced either closer to each other than the normal pictures, or are spaced farther apart than the normal pictures, so that for normal sight they will not fuse into one picture but will show as two separate pictures. These diverging pictures are preferably arranged to vary progressively by increasing or decreasing distances towards the end of the film as compared with the normal picture. At each location on the film an index mark is provided showing numerically the extent of the divergence or convergence for each set of pictures so that the user, in determining the set of pictures that fuse for his particular vision, sees at the same time the extent of divergence from normal, if any, that brings about this condition.

The film has the picture subjects spaced on separate portions thereof so that as the film is moved longitudinally through the field of vision of the device, this movement brings the complementary parts of the picture into view and removes the parts of all other pictures from the field of view. The complementary parts of the picture being part of an integral film, these parts have a fixed relation to each other which cannot be disturbed as the picture subjects are changed.

The entire mechanism comprises the stereoscope and a portion of film with the picture characters properly spaced thereon. The changing of the picture characters is accomplished by moving the film relative to the ground glass screens of the sighting device. The film may be moved back and forth by hand, or it may be made in the form of an endless belt and moved by clockwork or by hand operated stepping mechanism which is not shown in the present disclosure. The film may also be in the form of a revolving disc which will repeat its operation for each revolution. The effect of stereoscopic relief may be embodied in the pictures, but this effect is not essential to practising the invention. Where the term "stereoscopic" is used herein it implies the fusion or superimposing of overlapping parts of a picture subject into a single picture, rather than the effect of relief in pictures.

The invention will be more particularly understood from the following specification and the accompanying drawing, in which:

Fig. 1 indicates three sections of a motion picture film having a series of double picture subjects arranged according to this invention;

Figure 2:
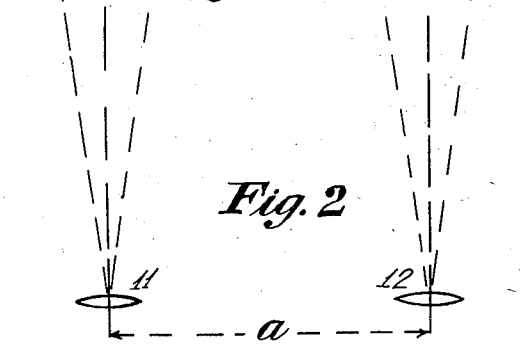
Fig. 2 is a diagram of a stereoscope arranged for viewing the picture subjects on the film in Fig. 1.

In Fig. 2, 11 and 12 are a pair of lenses of a stereoscope which are spaced apart by a distance indicated by $a$. The lens 11 sights the picture subject on film 15 on the axes $b$ and has a field of vision covering the ground glass screen 13 which makes the picture subject visible. The lens 12 in the same way sights the picture subject on the axes $c$ and has a field of vision covering the ground glass screen 14. The lenses 11 and 12 are adjusted to sight a double picture, one portion of which occupies the field 13 and the other portion occupies the field 14 so as to unite these pictures into a single picture subject with the overlapping parts fused together and giving the effect of stereoscopic relief when the picture subjects have been taken by a stereoscopic camera.

The film 21 has a picture background 22 and is provided with the usual notched apertures at 23 whereby it may be fed through the frame of the stereoscopic instrument which is not shown in the drawing. The film is provided with a series of double picture which for convenience in the drawing comprise the letters ON indicated at 24, and the letters NE indicated at 25 on the drawing. When fused together by the stereoscopic effect the letters N overlap each other and superimpose to form the one word ONE, as indicated in Fig. 3.

Figure 1:
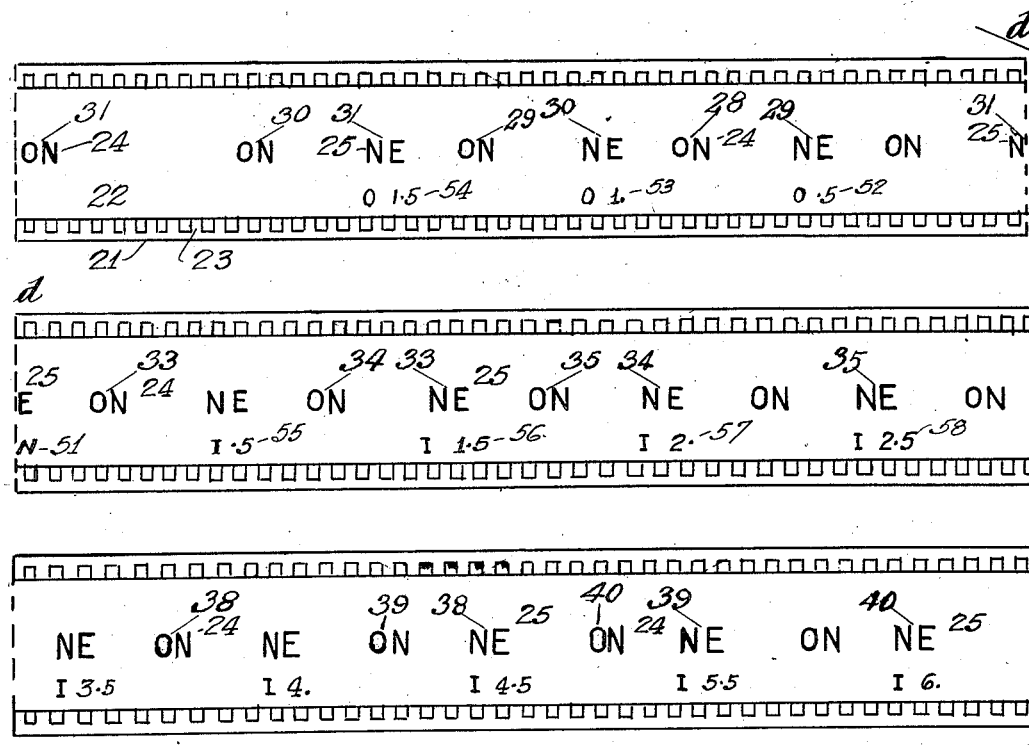
Figures 3, 4:
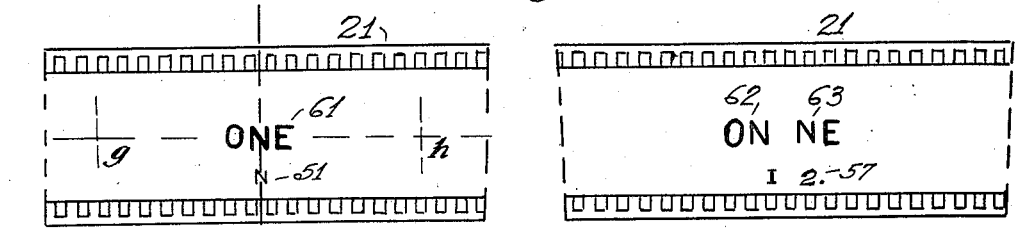
Fig. 3 shows the results obtained by the fusion of a normal picture on the film when viewed by the stereoscope.
Fig. 4 shows a result obtained with some of the double pictures from other portions of the film.

When one part of the double picture has its axes at $g$, Fig. 3, and the other part has its axes at $h$, corresponding to the focal centers $b$ and $c$ of the lenses 11 and 12, a normal picture is produced and for normal vision the overlapping portions of the picture are fused together. The normal portion of the film is indicated at 51 and includes the double picture 24 and 25 at location 28. This portion of the film has a mark below the picture indicated by the letter N showing that the normal picture is in the vision of the instrument. Extending towards the left from this normal location are a series of double pictures indicated at 29, 30 and 31. At each of these locations the space between the two portions of the double picture is progressively increased so that as they are brought into the sighting position on the stereoscope they gradually diverge from the conditions that obtain with the normal picture. The extent of the divergence is numerically indicated on the film by the numbers below the NE of each picture as at 52, 53 and 54. At 52 the letter O is used to indicate outward divergance to the extent of .5 at location 30 the divergence is indicated by 1., and at location 54 it is indicated by 1.5.

The portion of the film to the right from the normal picture at $d$ is arranged with a series of double picture subjects which are progressively spaced a shorter distance apart than the spacing of the normal picture subject, so that the pictures gradually converge instead of fusing under the stereoscopic effect. This is indicated on the drawing by the letter I at each location with a numeral indicating the extent of the converging, as indicated at 55, 56, 57, and 58 on the drawing. The double picture subjects are indicated by 33, 34, 35, 38, 39 and 40 and are located a fixed distance relative to each other on the film.

When the film is placed in the instrument, unless there is a fusion of the overlapping parts of the double picture as at 61 in Fig. 3, the result will in some cases correspond to 62 and 63 in Fig. 4. There is of course a wide variation in the location of the parts of the double picture in the various positions of the film, but by arranging the spacing of the double pictures progressively to increase or decrease a progressive change from normal in the extent of variation is produced and this change can be made rapidly or slowly as desired by the user. The result is that the eyes naturally tend to fuse the portions of the picture and in doing so the eye muscles are exercised without conscious effort on the part of the user, and by regulating the time in which any particular subject is viewed the eyes can be brought to obtain a fusion of the picture subjects in several positions of the film.

In using the device the operator places the end of the film through a slot in the stereoscope and closes the left eye. The film is moved until the right eye sights NE with the N underneath as at 51, which is the normal picture. If his vision is normal and he sights the picture with both eyes, it will make perfect fusion, giving results corresponding to Fig. 3. To increase convergence of the eyes the film is pulled toward the right until the next picture is reached, which is NE with I .5 thereunder. A test should now be made with both eyes to note if fusion is obtained. This may then be continued with the other subjects at locations 33, 34, 35, etc.

To exercise the eyes for divergence, start from the normal picture and move the film in the opposite direction for locations 29, 30, and 31, noting the result in each case and the degree of fusion obtained.

Eyes that are not normal, that is, that diverge or converge, will establish fusion in the picture subjects at some point other than the position of the normal picture, and the index characters at each location clearly show the extent to which the defective vision exists. This invention may be practiced by the use of pictures of animals or solid objects which will stand out in relief as viewed through the stereoscope, and which may form a source of entertainment as well as a means for exercising the muscles of the eyes.

Having thus described my invention, I claim:

1. In an optical exerciser, a motion picture film for a stereoscope, movable in the field of vision of the stereoscope, said film having double pictures spaced in the field of vision of the stereoscope, and arranged one after the other in the same straight line and longitudinally of the film, a normal double picture on one portion of the film spaced to fuse into a single picture when viewed through the stereoscope, other double pictures differently spaced from the normal picture in another portion of said film so as to diverge when brought into the field of vision and an index character on said film for each picture indicating the extent of the divergence.

2. A motion picture film for an optical device comprising a film arranged to move longitudinally in the fields of vision of a stereoscope, said film having double pictures arranged one after the other in the same straight line and longitudinally of the film, a normal double picture on one portion of the film having one part focused in one of said fields of vision and the other part focused in the other field of vision, said parts overlapping each other and fused into a single picture when viewed through the stereoscope and other double picture subjects on another portion of said film spaced closer together than said normal double picture subject so that the common parts of the picture will not overlap and fuse together when brought into the field of vision.

3. A film for an optical device arranged to move longitudinally in the fields of vision of a stereoscope, said film having double pictures spaced in the field of vision of the stereoscope and arranged one after the other in the same straight line and longitudinally of the film, a normal double picture on one portion of said film having one part arranged to focus in one of said fields of vision and the other part arranged to focus in the other field of vision, the common parts of said double picture fusing into a single picture when in said fields of vision and a plurality of other double picture subjects on another portion of said film, each spaced progressively to a greater or lesser distance than said normal double picture, so as to produce a progressive divergence or convergence between said pictures as they are brought into said fields of vision.

SAMUEL W. SILVERSTEIN.